Nov. 30, 1954     T. E. DUNN     2,695,996
FREQUENCY MODULATED RADAR

Filed Oct. 18, 1950     3 Sheets-Sheet 1

INVENTOR
*Ted E. Dunn*
BY
*J. L. Whittaker*
ATTORNEY

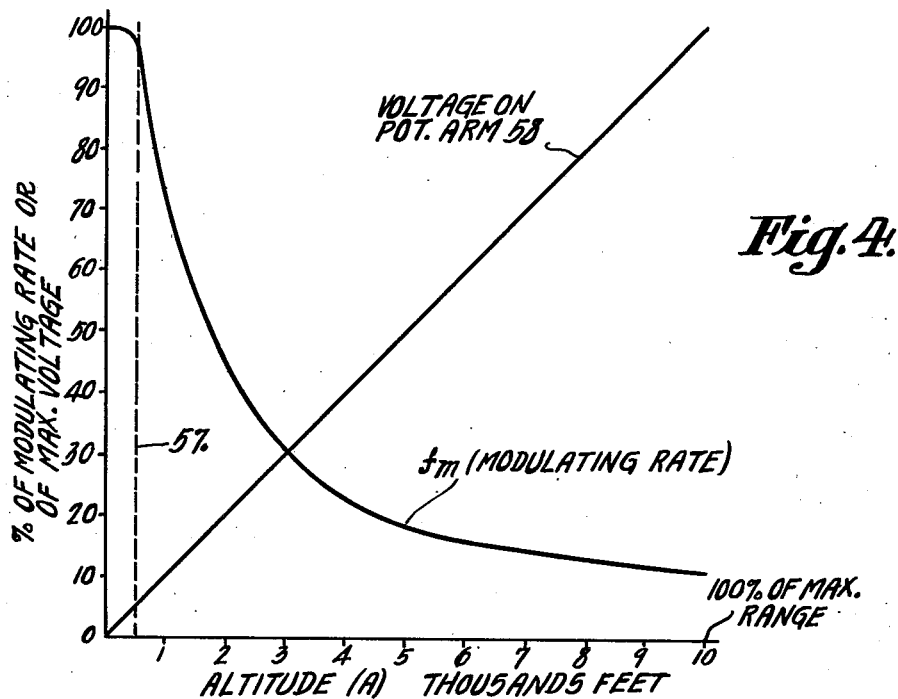
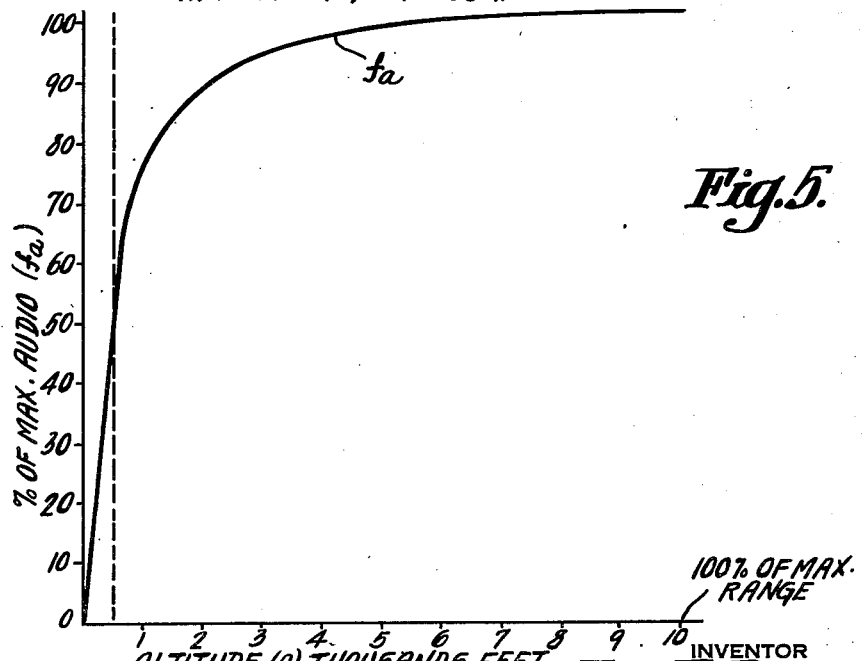

United States Patent Office 2,695,996
Patented Nov. 30, 1954

2,695,996

FREQUENCY MODULATED RADAR

Ted E. Dunn, Pennsauken, N. J., assignor to Radio Corporation of America, a corporation of Delaware Application October 18, 1950, Serial No. 190,771

19 Claims. (Cl. 343—14)

The present invention is related to distance measuring devices of the type known as frequency modulated radio echo detection and ranging (FM radar) devices. FM radars are most frequently used as altimeters.

In the operation of FM radars, a repetitively frequency modulated wave is continuously transmitted. The reflections from a distant object are beat against waves of the frequency being transmitted at the instant the reflection is received. The difference frequency is indicative of the distance to the reflecting object. The beat frequency is then counted to give an indication of the distance. FM radars may utilize circuits of the type disclosed in U. S. Patent 2,450,991 to R. C. Sanders, Jr., October 12, 1948. In this FM radar the reflected energy is beat against the transmitted energy, and the beat frequency amplified and limited. The beat frequency is then measured in a so-called counter circuit by the rate of charge (and discharge) of a storage capacitor. The resultant measure or count of the charging rate is indicated thereby to indicate the range to the reflecting object. In these and certain other conventional FM radar systems, a change in the frequency modulating rate often results in a change in the calibration of the indicator. Such a change in calibration is generally undesirable. It is therefore necessary to control closely the repetition rate of the frequency modulation. Furthermore, it is sometimes desired to increase the repetition rate in order to increase the signal-to-noise ratio, especially where approaching closely to a reflecting object or to the ground in the case of an altimeter. On the other hand, in order effectively to measure the distance of farther distant objects, it is sometimes necessary to decrease the repetition rate or frequency.

It is an object of the present invention to make the distance indication of a frequency modulated radar substantially independent of the repetition rate of the frequency modulation.

Another object of the invention is to reduce the dependency of the distance indication upon the repetition rate of the frequency modulation in such a radar.

A still further object of the invention is to permit the use of a less accurate or less closely controlled repetition rate of the frequency modulation in FM radars.

A still further object of the invention is to conserve the effective band width and increase the signal-to-noise ratio in FM radars without requiring recalibration.

A further object of the invention is to increase the practical range over which an FM radar may be effective.

Another object of the invention is to compress or decrease the repetition rate with increased altitude or increase the repetition rate with decreased altitude in an FM radar without requiring recalibration of the radar.

A still further object is to increase or decrease the repetition rate respectively with approach or departure from the reflecting object automatically.

In accordance with the invention, an auxiliary capacitor is connected and disconnected in a circuit in parallel with the storage capacitor of a counter circuit at a rate proportional to the repetition frequency whereby changes in the rate of charge and discharge of the storage capacitor due to changes in the repetition frequency tend to be compensated. The system indications according to the invention are thus substantially independent of the modulating rate. In accordance with a further important feature of the invention, the modulating rate is compressed or expanded automatically with range to improve accuracy and the signal-to-noise ratio.

These and other objects, advantages, and novel features of the invention will be more apparent from the following description when taken in connection with the accompanying drawing in which:

Figs. 4 and 5 are somewhat idealized graphs of characteristics of the system of Fig. 2 and which are useful in understanding the advantages of the system of Fig. 2.

Figure 1:
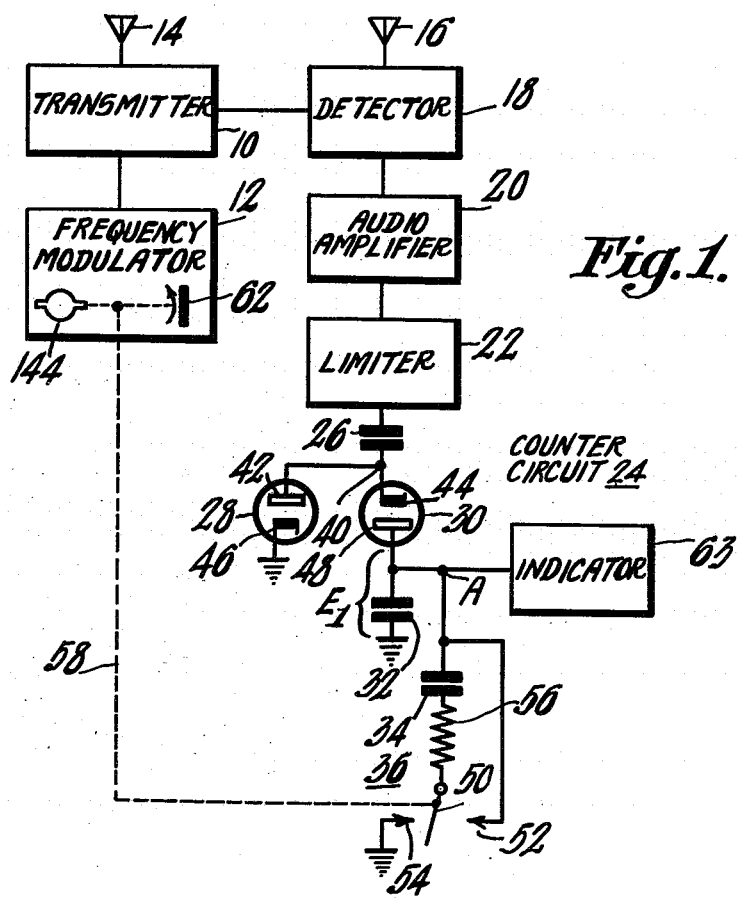
Fig. 1 is a diagram partially in block form, schematically illustrating an FM radar embodying the invention in a simplified form.

Referring now more particularly to Fig. 1, a radio transmitter 10 is modulated in frequency by a frequency modulator unit 12 which may include means to generate a triangular wave with which is produced, by frequency modulation, a voltage modulated substantially linearly with the triangular wave. The modulating frequency may be controlled, for example, by a capacitor 62 as a frequency controlling element having a rotor driven by a motor 144. The transmitter 10 radiates the waves from an antenna 14 preferably directive in characteristic. After the energy is reflected from a reflecting object, which may be the ground in the case of an altimeter, the energy is received by antenna 16 and supplied to a detector 18. The beat signal between the reflected energy and the energy being transmitted is derived in the detector 18. The detected frequency, usually considered as audio, is amplified in an amplifier 20 and limited in amplitude in a limiter 22. The resultant square wave beat frequency signal is then supplied to a countercircuit 24 which includes according to the invention a bucket capacitor 26, diodes 28 and 30, a storage capacitor 32, an auxiliary capacitor 34, and a single-pole double-throw switch 36. The bucket capacitor 26 is connected between the limiter 22 and the junction 40 of the anode 42 of diode 28 to the cathode 44 of diode 30. Cathode 46 of the diode 28 is grounded. The anode 48 of diode 30 is connected through storage capacitor 32 to ground and also to one side of auxiliary capacitor 34 at junction A. The switch arm or pole 50 of switch 36 is connected through a resistor 56 to the other side of auxiliary capacitor 34. One switch contact 52 is connected to one side of auxiliary capacitor 34. The other switch contact 54 is connected to ground.

At each negative going voltage change of the square wave form fed from limiter 22 to bucket capacitor 26, the latter charges through diode 30, and discharges on the next positive going change through diode 28. Therefore, there is a direct current flow around storage capacitor 32. Bucket capacitor 26 has a small capacity $C_1$ compared to that of storage capacitor 32, and the effective time constant of storage capacitor 32 through the arrangement of auxiliary capacitor 34 and switch 36 is relatively long compared to the frequency of the square wave applied to the bucket capacitor 26. Therefore, the direct current voltage between junction A and ground across storage capacitor 32 has a superimposed varying voltage of relatively small amplitude. For equilibrium, substantially all of the current through diode 30 must come through the combination of the auxiliary capacitor 34 and switch 36, assuming indicator 63 to have such a high impedance that current flow through it is negligible. Each time switch arm 50 connects to contact 52, auxiliary capacitor 34 discharges. Resistor 56 is only to limit current surges and sparking and its effect is negligible for the purposes of the present analysis. Each time contact arm 50 closes to contact 54, auxiliary capacitor 34 charges substantially to the voltage across storage capacitor 32. The capacity $C_2$ of auxiliary capacitor 34 is preferably much smaller than that of storage capacitor 32. Hence there is also a sawtooth component on the voltage at junction A due to the operation of switch 36.

Now, each time arm 50 contacts contact 54, the charge transferred from storage capacitor 32 to auxiliary capacitor 34 is substantially governed by $E_1$ which is the average voltage at the junction A. If the switch 36 is driven at a rate directly proportional to the modulating repetition rate $f_m$, then the current must be the rate of transfer of charge $q$ per second, or approximately $$i = C_2 E_1 k f_m \quad (1)$$

where $k$ is a constant. Let R be an effective resistance equivalent to that of the arrangement including auxiliary capacitor 34 and switch 36. Then $$R = \frac{1}{k f_m C_2} \quad (2)$$

Let $E_2$ be the peak-to-peak amplitude of the square wave from the limiter 22. Let $q_2$ be the charge transferred from bucket capacitor 26 to storage capacitor 32, each cycle of the audio frequency $f_a$. Then, approximately, $$q_2 = C_1(E_2 - E_1) \quad (3)$$

and the current through diode 30 is $$i = C_1(E_2 - E_1) f_a \quad (4)$$

These currents $i$ are equal and $$C_2 E_1 f_m = C_1(E_2 - E_1) f_a \quad (5)$$

from which $$E_1 = \frac{C_1 E_2 f_a}{C_2 k f_m + C_1 f_a} \quad (6)$$

$$E_1 = \frac{C_1 E_2 f_a \cdot 1/C_2 k f_m}{1 + C_1 f_a \cdot 1/C_2 k f_m} \quad (7)$$

and $$E_1 = \frac{E_2 C_1 R f_a}{1 + C_1 R f_a} \quad (8)$$

Also, it is readily proved that $$E_1 = \frac{E_2 C_1/C_2 \cdot f_s/246k \cdot A}{1 + C_1/C_2 \cdot f_s/246k \cdot A} \quad (9)$$

if the usual type of triangular sweep of frequencies is employed where A is the altitude and $f_s$ is the difference in extreme signal frequencies of the transmitter. A is expressed in feet.

Thus the counteroutput voltage $E_1$ is independent of the modulating frequency $f_m$. However, the signal-to-noise ratio of the reflected signals and of the audio or beat frequency voltage is a function of the modulation rate.

It is now apparent, since $C_1$, $C_2$, $f_s$, and $E_2$ are all constant for any particular operating embodiment of Fig. 1, that the voltage at altitude A to ground is dependent only on the range or altitude A and is independent of the modulating rate $f_m$. Therefore, calibration of the equipment is substantially independent, for practical purposes of the speed of the motor 144, and the modulating rate may change without recalibration of the equipment. However, the indicator voltage $E_1$ is not linear with altitude.

Figure 2:
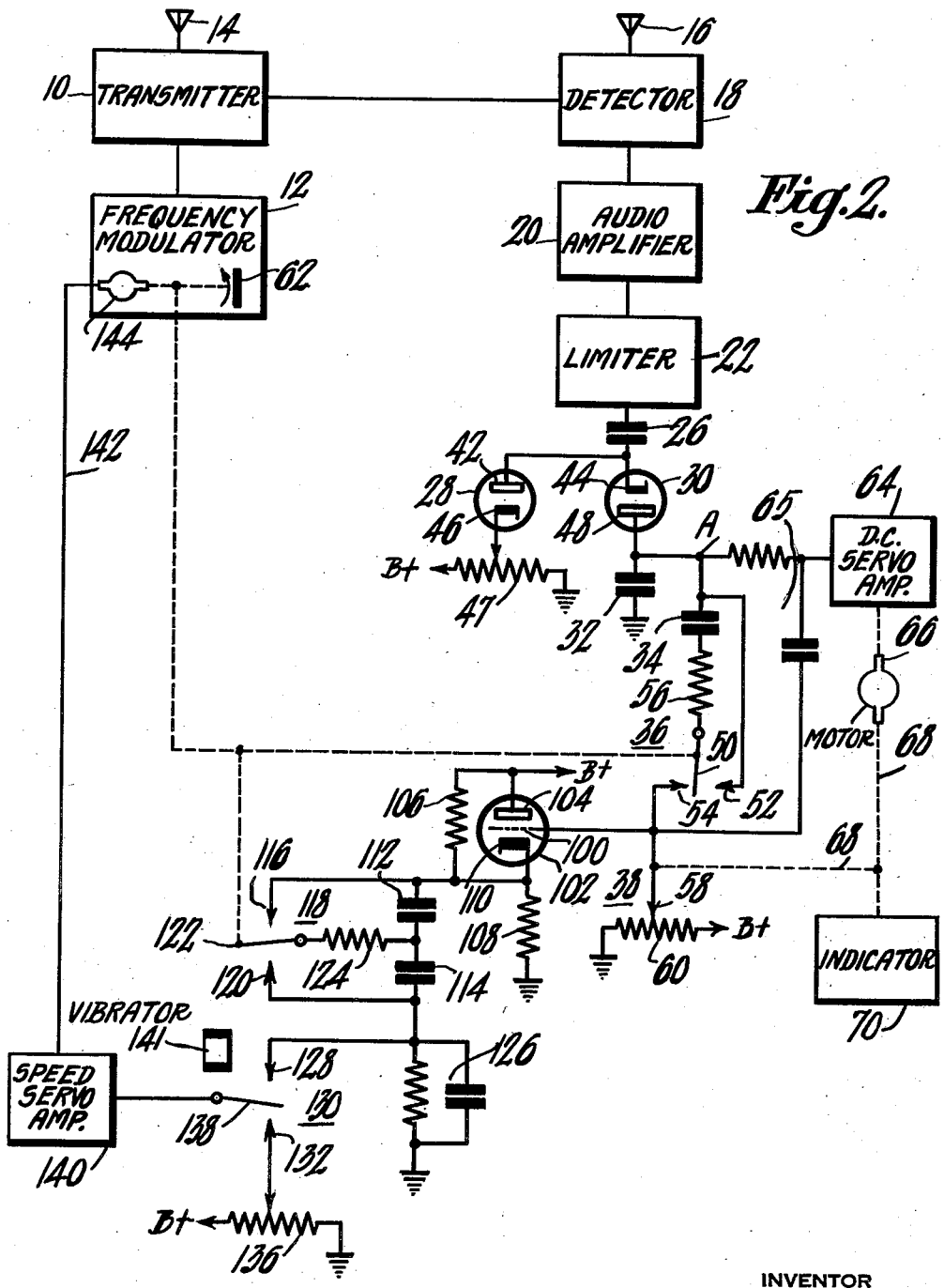
Fig. 2 is a diagram partially in block form, schematically illustrating a more elaborate FM radar embodying the invention.

The arrangement of Fig. 1 is a comparatively simple one. Referring now more particularly to Fig. 2, there is illustrated a somewhat more complex arrangement and one which conforms substantially to an arrangement in practical use. It will be observed that according to Equation 9 the voltage $E_1$ of Fig. 1 as indicated by the indicator 63 is not linear with altitude or range A even though it is independent of the modulating frequency $f_m$. It would be desirable to have a linear indication. Linearity is accomplished by using a D.-C. servo amplifier to maintain the voltage at the point A and give an indication of the current flow through that point. Furthermore, an additional improvement may be secured, in accordance with the invention by controlling the modulating rate in a suitable fashion (to be described more fully hereinafter) to be dependent on the range or altitude A. In Fig. 2, the components which are the same as those in Fig. 1 and which serve the same purpose, are indicated by the same reference numerals. A suitable bias supply 47 is arranged for the diode 28. It is desirable to place the cathode 46 at a positive potential with respect to ground by suitable bias supply 47 in order to avoid current flow from contact potentials and the Edison effect flow. Such current might give a false initial indication at the point A which was not the result of voltage supplied through the feed capacitor 26 from the detector. Instead of a simple indicator 63 connected at the point A, as in Fig. 1, in Fig. 2 there is connected at the point A a resistor-capacitor combination 65 which is in turn connected to a direct current servo amplifier 64 which operates a motor 66. The motor 66 has its shaft connected by mechanical connection 68 to an indicator 70 and also to drive as a load the potentiometer arm 58 which may be linear in motion with resistance. The junction between switch contact 54 and potentiometer arm 58 is connected to the grid 100 of a vacuum tube 102 which is connected as a biased cathode follower. The anode 104 of tube 102 is connected to the B+ supply. Two resistors 106, 108 are connected between the B+ supply and ground with the cathode 110 of tube 102 connected to their junction. The cathode 110 is also connected to one terminal of two serially connected capacitors 112 and 114. This one terminal is connected to the contact 116 of a switch 118 the other contact 120 of which is connected to the other terminal of the serially connected capacitors. The switch arm 122 of the single-pole double-throw switch 118 is connected through a damping resistor 124 to the junction between capacitors 112 and 114. The other terminal of the serially connected capacitors at the junction with contact 120 is connected to a resistor-capacitor combination 126. The junction point of contact 120 and combination 126 is also connected to a contact 128 of a single-pole double-throw switch 130 the other contact 132 of which is connected to a suitable bias supply 136. The switch arm 138 of the switch 130 is connected to a speed servo amplifier 140 the D.-C. output of which by a lead 142 is connected to control the modulating motor 144.

In operation of the arrangement illustrated in Fig. 2, the voltage at the point A (across storage capacitor 32) is an error voltage for the servo mechanism system which comprises the network 65, the amplifier 64, the potentiometer 38 and the switch 36. The potentiometer arm 58 is moved by the motor to bring the voltage at point A to zero with respect to ground. The network 65 is merely a damping network for the servo amplifier 64. The amplifier 64 causes the motor 66 to drive the arm 58 which acts as a movable servo load controlling the voltage applied to auxiliary capacitor 34, in a direction to bring the voltage at point A back to zero if it departs therefrom. It is readily proved that the voltage picked up by the arm 58 under these circumstances is linear with the altitude A. This voltage at potentiometer arm 58 is a measure of and proportional to the rate of charge (and discharge) of the storage capacitor 32. The charge increments being supplied from capacitor 26 equals the discharge decrements through the network including switch 36. This is merely another way of saying that the voltage at arm 58 is a measure of the current past or through point A.

The voltage thus picked up by the potentiometer arm 58 is used, in the preferred form of the invention of Fig. 2, as a control voltage for a speed servo system which includes the tube 102, the switch 118, the switch 130, the speed servo amplifier 140, and the modulating motor 144. This voltage from arm 58 controls the speed of the modulating motor 144, provided it is above ground by a predetermined amount. This predetermined amount of voltage is that required to cut off the tube 102. If the voltage applied to the grid 100 is below cut-off, the voltage across the resistor 108 determines the speed of the modulating motor 144 in the following manner: The effective resistance of the combination of the capacitors 112, 114, and the switch 122 which is actuated by the motor 144 at the modulating frequency $f_m$, or at a frequency directly proportional to $f_m$ is substantially inversely proportional to the modulating rate. The time constant of the resistor-capacitor combination 126 is large to give smoothing. The average direct-current voltage developed across capacitors 112, 114 and the combination 126 may be treated as though supplied by a voltage divider system and tapped off at the contact 128. The voltage difference between contact 128 and the voltage picked up from divider 136 and appearing at contact 132 is used as a control voltage for the speed servo amplifier 140. This difference voltage is chopped by switch 130 actuated by a vibrator 141 and applied to the speed servo amplifier 140 so that the motor speed of motor 144 is controlled thereby.

If the motor speed increases from some external cause, the effective resistance of the combination of switch 118 and capacitors 112, 114 is decreased. The difference voltage between contacts 138 and 132 is decreased, the voltage at 132 being greater. Speed servo amplifier 140, preferably being of high gain has a corresponding decrease in D.-C. voltage output to cause the speed to return substantially to its former value. Suppose now that the voltage at grid 100 is increased to make the tube 102 conduct. It is readily shown that the motor speed is decreased as a result of the speed servo loop, provided the constants of the system including the gain of the speed servo amplifier 140 are appropriately chosen. But increased voltage at grid 100 is representative of increased altitude over some given altitude. Therefore, as the altitude or range increases after it reaches a certain predetermined amount, the modulating frequency is decreased or compressed and vice versa. Another way of saying the same thing is that on approach to a reflecting object, the repetition rate is increased, and the repetition rate is decreased with departure from the reflecting object automatically.

Figure 3:
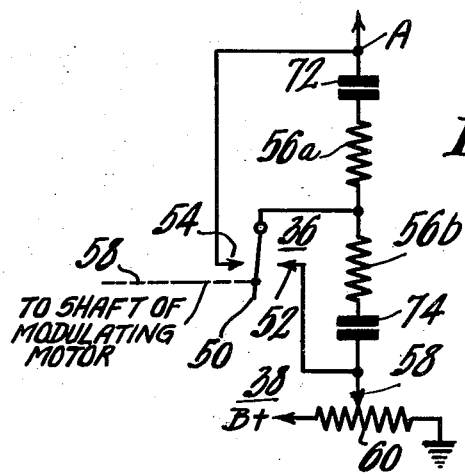
Fig. 3 is a diagram schematically illustrating an alternative circuit for a portion of the circuit of Fig. 1 or 2.

Instead of the circuit illustrated in Figs. 1 and 2 between the point A and the potentiometer 38, one might use the circuit illustrated in Fig. 3. By reasoning similar to that employed heretofore, in analyzing the circuit, it may be shown that the impedance between the point A and contact 58 is proportional to the inverse of the product of a capacity and the modulating frequency, the capacity in this case being the sum of the capacity of capacitors 72 and 74. The resistors 56A and 56B are small resistors which reduce sparking at the contact points. The same switch 36 may be employed in this circuit if desired. It will be apparent to those skilled in the art how the circuit of Fig. 3 should be connected in Fig. 1 or Fig. 2. The similarity between the circuit of Fig. 3 and that of the combination of capacitors 112, 114 and switch 118 of Fig. 2 may be noted.

Figs. 4 and 5 are illustrative of some of the advantageous characteristics of the system of Fig. 2. Referring to Fig. 4, it will be apparent that the modulating rate starts at a comparatively high rate with short range. This high modulation rate at short range contributes to high accuracy at the short ranges and also contributes to a favorable signal-to-noise ratio of the system. If the range is further increased and starting, for example, at about the point corresponding to approximately 5% of the total range or about 500 feet, the tube 102 of Fig. 2 is no longer cut off and the modulating rate is compressed with increased range. Again this contributes to favorable signal-to-noise ratios. Meanwhile, it is nevertheless true that the voltage at the potentiometer arm 58 is linear with range as indicated by the graph of the voltage on Fig. 4. The modulating rate characteristic plotted in Fig. 4 results in a characteristic of beat frequency plotted against range which is indicated in Fig. 5. This beat frequency starts at zero with zero range increases with great rapidity substantially linearly up to about 500 feet and then, because of the compression of the modulating rate, becomes compressed to a maximum of about 16,000 cycles per second which is chosen to be an optimum for the particular design of equipment employed herein. Accordingly, the measurement of distance to the farther objects, or the measurement of greater range is enhanced by the decreased modulating rate even as the measurement of the shorter ranges is enhanced by the increased modulating rate at the shorter ranges. The strict linearity of the indicator system is achieved and any requirement for recalibration with the change in modulating rate is obviated.

It will be apparent that there are many variations which could be made either in the simpler system of Fig. 1 or the more complex system of Fig. 2. One example would be to reverse the polarity of the voltage at junction A by reversing connections of the diodes 28, 30, with other appropriate circuit changes. The alternative circuit of Fig. 3 is an example of one of the variations which could be made without departing from the principles of the invention.

What I claim as my invention is:

1. In an FM radar counter circuit for counting a beat frequency voltage between a variable frequency modulated voltage recurring at a repetition rate and a reflected signal voltage and having a storage capacitor charging at a rate dependent on said beat frequency voltage, the combination of a circuit in parallel with said storage capacitor, the effective resistance of the total paralleling circuit about said storage capacitor to direct current flow being substantially inversely proportional to said repetition rate, thereby substantially compensating in the voltage across said storage capacitor for changes in the repetition rate.

2. In an FM radar counter circuit for counting a beat frequency voltage between a variable frequency modulated voltage recurring at a repetition rate and a reflected signal voltage and having a storage capacitor charging at a rate dependent on said beat frequency voltage, the combination comprising an auxiliary capacitor, and means to connect said auxiliary capacitor in a circuit in parallel with said storage capacitor and to discharge said auxiliary capacitor substantially completely at a rate proportional to said repetition rate, the effective resistance of the total paralleling circuit about said storage capacitor to direct current flow being substantially inversely proportional to said repetition rate.

3. The combination claimed in claim 2, further comprising means to control said repetition rate in response to the rate of charge of said storage capacitor.

4. The combination claimed in claim 3, further comprising a servo circuit controlling the voltage from a voltage source and having the voltage across said storage capacitor as an error voltage, the said controlled voltage source being serially connected to said auxiliary capacitor as part of said parallel circuit.

5. In a counter circuit for counting a limited amplitude beat frequency voltage between a reflected voltage and frequency voltage recurring at a repetition rate, and comprising a serially connected rectifying element and storage capacitor receiving said beat frequency voltage, a second rectifying element connected in reverse polarity across the serially connected first element and storage capacitor, the improvement comprising a discharging circuit for said storage capacitor having an effective resistance to direct current flow substantialy inversely proportional to said repetition rate, thereby substantially compensating for changes in the repetition rate.

6. In a counter circuit for counting a limited amplitude beat frequency voltage between a frequency modulated voltage recurring at a repetition rate and a reflected voltage, and comprising a bucket capacitor, a serially connected rectifying element and storage capacitor, a second rectifying element connected in reverse polarity across the serially connected first rectifying element and storage capacitor, the improvement comprising a discharging circuit for said storage capacitor having an effective resistance to direct current flow substantially inversely proportional to said repetition rate, thereby substantially compensating for changes in the repetition rate.

7. In a counter circuit for counting a limited amplitude beat frequency voltage between a frequency modulated voltage recurring at a repetition rate and a reflected voltage, and comprising a bucket capacitor, a serially connected rectifying element and storage capacitor, a second rectifier connected in reverse polarity across the serially connected first rectifying element and storage capacitor, the improvement comprising a discharging circuit for said storage capacitor including an auxiliary capacitor and means to connect said discharging circuit including said auxiliary capacitor in parallel with said storage capacitor and to discharge said auxiliary capacitor substantially completely at a rate proportional to said repetition rate, the entire said discharging circuit having circuit values to provide an effective resistance to direct current flow substantially inversely proportional to said repetition rate, thereby substantially compensating in the charging current of said storage capacitor for changes in the repetition rate.

8. In a receiver for a distance measuring device comprising an antenna to receive energy reflected from an object, said energy being reflected from energy of transmission modulated over a band of frequencies at a repetition rate, a detector to detect a beat frequency between the transmitted and reflected energy, a limiter to limit the amplitude of the beat frequency, and a counter circuit comprising a rectifier element and a storage capacitor in series therewith connected to receive the voltage from said limiter, whereby said storage capacitor is charged at a rate dependent on the detected frequency, the improvement comprising a discharging circuit for said capacitor including an auxiliary capacitor and means to connect said discharging circuit including said auxiliary capacitor in parallel with said first capacitor and to discharge said auxiliary capacitor substantially completely at a rate directly proportional to said repetition rate, the entire said discharging circuit having circuit values to provide an effective resistance to direct current flow substantially inversely proportional to said repetition rate, thereby tending to compensate for changes in the repetition rate.

9. The combination in a distance measuring device, comprising a transmitter having means including a motor to modulate the energy of transmission therefrom over a band of frequencies at a repetition rate, a detector connected to said transmitter and to receive energy of transmission reflected from an object to detect a beat frequency between the transmitted and reflected energy, a limiter to limit the amplitude of the beat frequency and a counter circuit comprising a rectifier element and a storage capacitor in series therewith connected to receive the voltage from said limiter whereby said storage capacitor is charged at a rate dependent on the detected frequency, a discharging circuit for said capacitor including an auxiliary capacitor and a switch to connect said discharging circuit including auxiliary capacitor in parallel with said first capacitor and to discharge said auxiliary capacitor substantially completely at a rate directly proportional to said repetition rate, said discharging circuit having an effective resistance to direct current flow substantially inversely proportional to said repetition rate, and a connection between said switch and said motor, whereby said rate of charge storage is substantially independent of said repetition rate.

10. The combination claimed in claim 9, said connection to said motor including a mechanical connection.

11. The combination claimed in claim 9, further comprising a servo system responsive to an error voltage and connected to receive the voltage across said storage capacitor as said error voltage, and a voltage supply connected to said switch and responsive to the error voltage as the load controlled by said servo mechanism system.

12. The combination claimed in claim 9, further comprising a servo mechanism system responsive to an error voltage and connected to receive the voltage across said storage capacitor as said error voltage, and a voltage supply connected to said switch and having a movable control member which member is the load mechanically driven by said servo mechanism system.

13. The combination claimed in claim 9, further comprising a speed servo system, and means to derive a voltage proportional to the rate of discharge of said storage capacitor, said voltage being applied as a control voltage for said speed servo system to control the speed of said motor to decrease said repetition rate with increased range and vice versa over at least a part of the total range of the receiver.

14. The combination claimed in claim 13, said control voltage controlling said motor speed after and only after said control voltage is in excess of a given voltage whereby said repetition rate is constant with ranges less than a given range and decreases with increased range greater than said given range and vice versa.

15. The combination claimed in claim 9, further comprising a first servo system responsive to an error voltage and connected to receive the voltage across said storage capacitor as said error voltage and with a variable voltage supply as load, said variable voltage supply being connected to said switch of said discharge circuit for said storage capacitor, and a speed servo system controlling the speed of said motor and thereby controlling said repetition rate, said speed servo system being responsive to the voltage at said variable voltage supply as a control voltage.

16. The invention according to claim 8 wherein said discharging circuit connect and disconnect means comprises a single-pole double-throw switch having two contacts connected respectively to different terminals of said auxiliary capacitor, one terminal of said auxiliary capacitor being connected to one terminal of said storage capacitor, the said pole of said switch being connected to the other storage capacitor terminal.

17. The invention according to claim 7 wherein said discharging circuit comprises a second auxiliary capacitor, said connect and disconnect means comprises a single-pole double-throw switch, said auxiliary capacitors being serially connected with one terminal of each in common, said common connection being connected to the pole of said switch, the other auxiliary capacitors' terminals being connected respectively to the terminals of said storage capacitor.

18. The combination comprising a transmitter having means to modulate the energy of transmission therefrom over a band of frequencies at a repetition rate and having a transmitter antenna from which said energy is transmitted, a receiving antenna to receive energy of transmission after reflection from an object, a detector connected to said receiving antenna and to said transmitter to detect a beat frequency signal between the transmitted and reflected energy, an amplifier to amplify the detected beat frequency signal, a limiter to receive and limit the amplified beat frequency signal, a bucket capacitor, a pair of rectifier elements each having an anode and a cathode, the anode of one and the cathode of the other being connected directly together and to one terminal of said bucket capacitor, the other terminal of said bucket capacitor being connected to said limiter, whereby said bucket capacitor feeds the limited beat frequency signal to said rectifier elements, a storage capacitor connected between a conventional ground connection and said anode of said other rectifier element, a bias supply connected with its negative terminal to said ground connection and its positive terminal to said cathode of said one rectifier element, a discharging circuit for said storage capacitor comprising an auxiliary capacitor, a switch, a variable voltage supply having its negative terminal connected to said ground connection and having its positive terminal connected to said switch, said switch being actuated at a rate directly proportional to said repetition rate thereby to discharge said storage capacitor periodically through said auxiliary capacitor and voltage supply at said repetition rate, and a servo system responsive to an error voltage and connected to receive the voltage across said storage capacitor as said error voltage, said servo system having as a load means to vary the voltage from said voltage supply in response to said error voltage whereby said rate of charge of said storage capacitor and the rate of discharge thereof are brought to an equilibrium with substantially zero voltage across said voltage capacitor.

19. The combination claimed in claim 18, further comprising a speed servo system controlling the said repetition rate and controlled by a speed control voltage, a vacuum tube having an anode, a cathode, and a control element connected as a cathode follower biased to cut-off for voltages on said control element below a given voltage, said cathode being connected to said speed servo amplifier as the control voltage thereof, said variable voltage supply being connected to said control element whereby the voltage of said variable voltage supply controls the said repetition rate if and only if the said voltage supply exceeds a given voltage.

References Cited in the file of this patent

UNITED STATES PATENTS

| Number | Name | Date |
|---|---|---|
| 2,427,215 | Kihn | Sept. 9, 1947 |